United States Patent Office 3,435,730
Patented Apr. 1, 1969

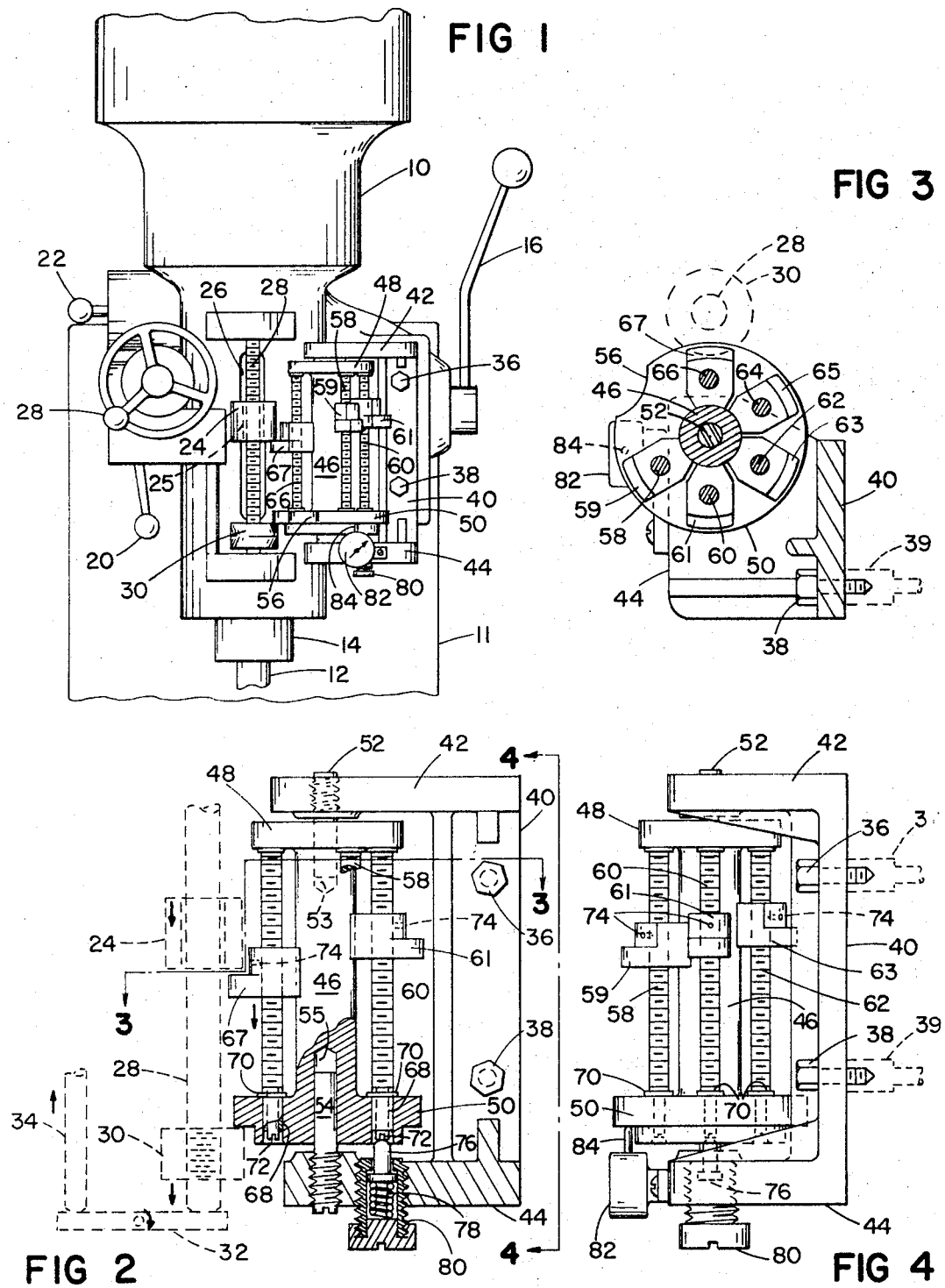

3,435,730
ANCILLARY MACHINE FEED TRIPPING
MECHANISM
John A. Berberian, Burlington, Mass., assignor to BST
Co., Cambridge, Mass., a partnership
Filed Jan. 26, 1967, Ser. No. 611,940
Int. Cl. B23c 1/06; B23b 47/18
U.S. Cl. 90—14            16 Claims

ABSTRACT OF THE DISCLOSURE

Ancillary stop structure in a machine having a quill stop, an adjustable micrometer nut, automatic and manual feed mechanisms, and automatic feed tripping mechanism actuated by movement of said nut, the ancillary structure rotatably positioned beside the quill stop path and having a flange between the quill stop and nut and in abutment with the nut, and also having adjustable stops one of which selectively may be positioned in the quill stop path, the nut and ancillary structure movable a distance greater than that required to actuate the tripping mechanism.

Ancillary machine feed tripping mechanism

This invention relates to machines having automatic and manual feed controls and a tripping mechanism for the automatic feed and more particularly relates to ancillary apparatus therefor which is adapted to actuate the tripping mechanism in a selected one of a plurality of predetermined feed positions.

A principal object of this invention is to provide ancillary apparatus which may be utilized with a machine having an adjustable element for actuating a tripping mechanism and a movable member for engaging the adjustable member. A further object of this invention is to provide such ancillary apparatus which adapted to permit manual operation of feed beyond the feed position at which the tripping mechanism is actuated. Another object of this invention is to provide such apparatus in such a manner that it need not be disengaged for manual machine feed after the tripping mechanism is actuated. Another object is to provide means operable with said apparatus for visually determining the amount of feed beyond the actuating position of the tripping mechanism. Another object is to provide in such apparatus feed stop members which are easily and accurately adjustable. Other objects are to provide such apparatus which is simple and economical to make and use and which is nonetheless rugged in construction.

In gneral, this invention features ancillary apparatus including a frame and a stop support rotatably mounted thereon. Shafts on the support carry adjustable stop blocks thereon. The support is axially movable on the frame a distance at least as great as the distance required to actuate the tripping mechanism and also includes a flange portion extending beyond the frame. Such apparatus may be mounted in a machine of the character aforementioned with the flange extending over an adjustable element which trips the automatic feed on movement. One stop block is positioned in the path of a movable member, normally used to move the adjustable element. Thus, as the movable element strikes a stop block the stop support flange moves the adjustable element to trip the automatic feed. In a preferred embodiment, however, the movable member, stop block, stop support and adjustable member may be moved a short distance further by manual feed. Also in a preferred embodiment an indicator is utilized to indicate the distance moved by the stop support.

Other objects, features and advantages of this invention will be apparent to those skilled in the art from the following detailed description of a preferred embodiment thereof together with the accompanying drawings in which:

FIG. 1 is a front elevation view of a turret milling machine incorporating the invention;

FIG. 2 is an enlarged front elevation view, partially broken away, of the invention;

FIG. 3 is a view taken along the line 3—3 of FIG. 2; and

FIG. 4 is a view taken along the line 4—4 of FIG. 2.

Description of the preferred embodiment

The turret milling machine illustrated in FIG. 1 is of the type manufactured under the trademark "Bridgeport" by Bridgeport Machines, Inc., of Bridgeport, Conn., and has a meter housing 10 mounted on a support 11 above a table (not shown). The machine includes a rotatable spindle 12 for carrying a cutting tool (not shown), and an axially movable quill 14 for raising and lowering the spindle 12. A quill feed handle 16 is provided for rough adjustment of the quill 14 and a manual feed handwheel 18 is provided for fine adjustment of the quill 14 via an automatic feed gear train. Other control levers 20, 22 are provided for engaging and controlling an automatic feed for the quill 14.

A quill stop 24 is connected to the quill 14 and is movable therewith through extending slot 26 in housing 10. A micrometer screw 28 is mounted on the housing 10 and non-engagingly extends through a bore 25 in quill stop 24. A micrometer nut 30 is adjustably mounted on the micrometer screw 38 below quill stop 24. As shown in FIG. 2, in in broken lines screw 28 is axially movable and has its base mounted on a pivoted trip lever 32. A trip plunger 34 is mounted on the other end of lever 32 for disengaging the automatic feed on movement of screw 28 downwardly when the quill stop 24 strikes the micrometer nut 30 as it is moved downwardly. A spring (not shown) normally biases the feed tripping mechanism (i.e., screw 28, lever 32 and plunger 34) away from the tripping position thereof. The tripping position of the mechanism is reached well before the limit of movement of that mechanism.

The present invention is designed for use in this milling machine. A frame 40 is provided and is mounted on machine housing 10 by bolts 36, 38. Bolts 36, 38 are positioned at the normal position of machine bolts which are used to connect the machine to support 11. As shown in FIGS. 3 and 4 in broken lines, adaptor studs 37, 39 having tapped heads for receiving bolts 36, 38, may be used to replace the bolts normally utilized, for mounting the machine and for spacing the frame 40 from housing 10 for proper location relative to the feed tripping mechanism.

Frame 40 includes a pair of spaced horizontal support elements 42, 44. A stop support spool having a barrel 46 and spaced parallel flanges 48, 50 is axially mounted between support elements 42, 44 via support shafts 52, 54 threadedly mounted in elements 42, 44 and extending therefrom toward each other into bores 53, 55 axially located in the spool barrel 46. The axial dimension of the spool is less than the distance between support elements 42, 44 by an amount greater than the distance nut 30 must be moved to trip the automatic feed mechanism and the distance between the adjacent ends of the bores 53, 55 within which shafts 52, 54 are positioned, is less than the distance between the adjacent ends of shafts 52, 54 by an amount greater than the distance nut 30 must be moved to trip the automatic feed mechanism, thereby to permit axial movement of the spool greater than that required to trip the feed mechanism. Lower flange 50 has a diameter sufficient to extend over micrometer nut 30 to engage the upper surface of the nut 30 with said nut screwed down adjacent the base of screw 28 and the screw 28 biased away from its tripping position. A cutaway portion 56 is provided in flange 50 to permit movement of nut 30 and/or quill stop 24 thereby in one rotative position of the flange 50 for normal machine operation.

A plurality of adjusting screws 58, 60, 62, 64, 66, are rotatably supported in flanges 48, 50 at spaced positions on a common circle diameter about barrel 46 along axes parallel to that of screw 28, the position at cutaway portion 56 being left unoccupied. The ends of adjusting screws 58, 60, 62, 64, 66 are positioned in axially aligned bores in flanges 48, 50. As shown in FIG. 2, the ends of the adjusting screws are of reduced diameter and are rotatably mounted in bushings 68 which are retained by split ring washers 70. Slots or detents 72 are provided in the lower ends of the adjusting screws for rotation thereof with a screwdriver, Allen-head wrench or the like. The diameter of the bores of lower flange 50 is slightly larger than that of the adjusting screws to permit assembly of the adjusting screws therethrough.

On each of the adjusting screws 58, 60, 62, 64, 66, is mounted in threaded engagement therewith a stop block member 59, 61, 63, 65, 67. The stop members extend outwardly for engagement with quill stop 24 when moved thereadjacent. The inner ends of the stop members form arcs conforming to the circumference of barrel 46 thereby to retain the radially extending positions of the stop members even as the adjusting screws 58, 60, 62, 64, 66 are rotated about their own axes. In a preferred form the stop members are cut from a single circular block having a bore therein equal to the barrel diameter thereby to obtain the desired arcuate configuration of their inner ends. Set screws 74 are provided in the stop members for locking the positions of the adjusting screws relative thereto.

An indexing pin 76 is provided in support element 44 of frame 40 along the circle diameter on which adjusting screws 58, 60, 62, 64, 66 are located. Spring 78 in bore cap 80 normally biases pin 76 upwardly. The pin 76 is dimensioned to engage the bases of the adjusting screws in the bores of lower flange 50, thereby biasing flange 50 upwardly to the upper extent of its axial movement and indexing the stop members.

Connected to the front edge of frame 40 is dial indicator 82 having a sensor 84 in contact with the lower surface of flange 50 adapted to indicate extent of movement of flange 50 downward from its upwardly biased position. The indicator is set at zero for the uppermost position of flange 50.

In operation, if desired machine operation is such that uniform quill 14 movement is to be provided, the spool is rotated to position cutaway portion 52 of flange 50 adjacent micrometer screw 28. The micrometer nut 30 is then adjusted in the usual manner for operation with quill stop 24.

If, however, a plurality of depths is required, either seriatum or selectively, micrometer nut 30 is moved to the base of screw 28 and the spool is rotated to position flange 50 over the nut 30. The nut 30 is then raised if necessary to abut the undersurface of flange 50, indicator 82 being set at zero. The adjusting screws 58, 60, 62, 64, 66 are rotated, set screws 74 having been loosened, to move their respective stock block members 59, 61, 63, 65, 67 to predetermined desired heights after which the set screws 74 are again tightened. The proper stop block member is then moved adjacent screw 28. Pin 76 and spring 78, seated against the base of one adjusting screw, bias the spool upwardly and index the selected stop block member at screw 28. Thereafter the machine is operated.

As the quill stop 24 descends it strikes the selected stop member which via flange 50 and nut 30 actuates the tripping mechanism to stop automatic feed. The stop position may be read on indicator 82, and if further feed be required, overtravel may be utilized by operating manual feed handwheel 18 to move down short distances further. The exact amount of overtravel is read on indicator 82. Thereafter, the feed is reversed, quill stop 24 is moved upwardly, the spool is moved to its uppermost position by the biasing pressure of spring 78 and the indicator thereupon returns to zero. To select a different depth, the spool is simply rotated to move another of the stop members adjacent micrometer screw 28.

Other embodiments of this invention will occur to those skilled in the art which are within the scope of the following claims:

What is claimed is:

1. In a machine having a movable member, an automatic feed therefor, a manual feed therefor, a movable member stop movable with said movable member, a movable adjustable element in the path of said movable member stop and a feed tripping mechanism responsive to movement of said adjustable element by said movable member stop to stop said automatic feed, said adjustable element being movable by said movable member stop on operation of said manual feed beyond the actuating position of said feed tripping mechanism, ancillary stop structure comprising:

a mounting frame fixedly positioned beside said movable member stop path;

a stop support rotatably mounted on said frame and having an axis parallel to said path and a flange portion extending to a position between said adjustable element and said movable member stop;

a plurality of adjusting shafts on said stop support positioned beside said path and having axes parallel to said path;

a stop block adjustably mounted on each said shaft and radially extending therefrom into said path between said movable member stop and said adjustable element in one rotative position only of said stop support; and means interconnecting said frame and said support for permitting axial movement of said support a limited distance greater than the distance said adjustable element must be moved to actuate said tripping mechanism;

whereby on movement of said movable member stop against a stop block said flange is adapted to move said adjustable element to actuate said feed tripping mechanism and thereafter, if desired said movable member may be moved a further limited distance.

2. The apparatus claimed in claim 1 in combination with an indicator operatively interconnected between said frame and said stop support for indicating the relative positions thereof.

3. The apparatus claimed in claim 1 in which said frame includes a pair of spaced, parallel support elements, said stop support is a spool having a central shaft portion and axially spaced flange portions at opposite ends of said central shaft portion, the axis of said spool extending between said support elements, said means for axial movement of said stop support comprising shaft bearings extending toward each other from said support elements into axially extending bores in said spool, the maximum axial length of said spool being less than the distance between said support elements by an amount greater than the distance said adjustable element must be moved to actuate said tripping mechanism and the distance between adjacent ends of said bores being greater that the distance between adjacent ends of said bearings by an amount greater than the distance said adjustable element must be moved to actuate said tripping mechanism.

4. The apparatus claimed in claim 3 in combination with an indicator operatively interconnected between said frame and said stop support for indicating the relative positions thereof.

5. The apparatus claimed in claim 1 in which said shafts are screws rotatably mounted in said stop support and said stop blocks are threadedly mounted thereon for axial adjustment on rotation of said screws.

6. The apparatus claimed in claim 5 in which said stop support is a spool having a central shaft portion extending along its axis parallel to the axes of and beside said screws, said screw axes are positioned on a common radius coaxial with said stop support, and said stop blocks having inner portions abutting said barrel along common arcs.

7. The apparatus claimed in claim 6 in combination with an indicator operatively interconnected between said frame and said stop support for indicating the relative positions thereof.

8. The apparatus claimed in claim 6 in which said frame includes a pair of spaced, parallel support elements, said spool having axially spaced flange portions at opposite ends of said central shaft portion, the axis of said spool extending between said support elements, said means for axial movement of said stop support comprising shaft bearings extending toward each other from said support elements into axially extending bores in said spool, the maximum axial length of said spool being less than the distance between said support elements by an amount greater than the distance said adjustable element must be moved to actuate said tripping mechanism and the distance between adjacent ends of said bores being greater than the distance between adjacent ends of said bearings by an amount greater than the distance said adjustable element must be moved to actuate said tripping mechanism.

9. The apparatus claimed in claim 8 in combination with an indicator operatively interconnected between said frame and said stop support for indicating the relative positions thereof.

10. The apparatus claimed in claim 9 further including biasing means acting between said frame and said spool for urging said spool away from said actuating position.

11. In a machine having a movable member, an automatic feed therefor, a movable member stop movable with said movable member, a movable adjustable element in the path of said movable member stop and a feed tripping mechanism responsive to movement of said adjustable element by said movable member stop to stop said automatic feed, ancillary stop structure comprising:
 a mounting frame having a pair of spaced parallel support elements positioned beside said movable member stop path;
 a stop support having a central shaft portion with an axis parallel to said path and a pair of flanges, one at each end of said shaft, said stop support positioned between said support elements and having a maximum axial dimension less than the distance between said support elements by an amount at least as great as the distance of movement of said adjustable element required to actuate said tripping mechanism, and one of said flanges adjacent said adjustable element extending to a position between said movable member stop and said adjustable element;
 axially positioned bores in said stop support;
 shaft bearings connected to said support elements and extending axially into said bores, the distance between adjacent ends of said bearings being greater than the distance between adjacent ends of said bores by an amount at least as great as the distance of movement of said adjustable element required to actuate said tripping mechanism, said stop support thereby being rotatably and axially movable between said support elements;
 a plurality of screws rotatably mounted in said flanges in spaced apart positions on a common radius, said screws having their axes parallel to and beside said path;
 a stop block threadedly mounted on each said screw for axial adjustment on rotation of said screw, said stop blocks each having a radially extending outer end extending to a position in said path spaced from said adjustable element and also having an inner end in abutment with said central shaft portion along a transverse dimension thereof;
 whereby one of a plurality of adjustable stop blocks may be positioned selectively in said path and said tripping mechanism may be actuated on movement of said stop support upon contact of said movable member with said stop block in said path.

12. The apparatus claimed in claim 1 further including a recess in said stop support for each rotative position thereof and also further including an indexing pin in said frame extending to said recesses and biasing means biasing said pin to said recesses whereby said stop support may be positively indexed in selective rotative positions with said stop blocks selectively in said path.

13. The apparatus claimed in claim 12 in which said one flange includes a cutaway portion at one rotative position of said stop support and has no stop block at said one position whereby said adjustable element and said movable member are operative independently of said apparatus.

14. The apparatus claimed in claim 13 in which said pin extends along an axis parallel to said path and is positioned in said support element adjacent said one flange, said biasing means thereby biasing said stop support away from said actuating position of said tripping mechanism.

15. The apparatus claimed in claim 14 in said machine in which said machine has additionally a manual feed and in which said adjustable element is movable by said movable member stop on operation of said manual feed beyond said feed tripping mechanism actuating position, the distances, by which said stop support axial dimension is less than the distance between said support elements and by which the distance between said bearings' adjacent ends exceeds the distance between said bores' adjacent ends, being greater than the distance of movement of said adjustable element required to actuate said tripping mechanism.

16. The apparatus claimed in claim 15 in combination with an indicator operatively interconnected between said frame and said stop support for indicating the relative positions thereof.

References Cited

UNITED STATES PATENTS

| | | | |
|---|---|---|---|
| 1,968,276 | 7/1934 | Armitage | 77—34.5 X |
| 2,909,082 | 10/1959 | Booth | 77—34.5 X |
| 3,051,024 | 8/1962 | Frushour | 77—34.5 |

ANDREW R. JUHASZ, *Primary Examiner.*

G. WEIDENFELD, *Assistant Examiner.*

U.S. Cl. X.R.

77—34.5